United States Patent [19]

Peterson

[11] 4,072,051
[45] Feb. 7, 1978

[54] PARAMETER COMPENSATING SYSTEM FOR A FLOWMETER

[75] Inventor: Jerry R. Peterson, Erie, Pa.

[73] Assignee: Geosource, Inc., Houston, Tex.

[21] Appl. No.: 680,919

[22] Filed: Apr. 28, 1976

[51] Int. Cl.² .................... G01F 1/12; G01F 1/86; G01K 7/20

[52] U.S. Cl. .................... 73/194 M; 73/344; 73/362 AR; 73/362.4

[58] Field of Search .................... 73/344, 194 M, 198, 73/231 M, 233, 362.4, 362 AR, 1 F; 235/151.34; 340/248 B, 248 C, 228 R

[56] References Cited

U.S. PATENT DOCUMENTS

| | | | |
|---|---|---|---|
| 1,297,326 | 3/1919 | Dahl et al. | 116/101 X |
| 2,285,118 | 6/1942 | Jones | 73/262 AR X |
| 3,447,075 | 5/1969 | Williams | 73/362 AR X |
| 3,531,990 | 10/1970 | Shinskey | 73/362 AR X |
| 3,588,856 | 6/1971 | Bauer et al. | 340/248 B |
| 3,789,242 | 1/1974 | Cantor | 340/248 C |
| 3,805,616 | 4/1974 | Sugiyama | 73/362 AR |
| 3,822,377 | 7/1974 | Beck | 73/194 M |
| 3,882,481 | 5/1975 | Turner | 73/362 AR X |
| 3,895,529 | 7/1975 | Moore | 73/194 M |

Primary Examiner—James J. Gill
Attorney, Agent, or Firm—Andrus, Sceales, Starke & Sawall

[57] ABSTRACT

A flowmeter system of the type employing a modification circuit responds to a pulse producing volumetric flow transducer and to a signal converter connected to a temperature sensitive transducer for providing a compensated metered output of a corrected series of output pulses relating to a selected reference base or standard temperature for the fluid. The signal converter is connected to the remotely located probe through a connecting circuit and functions to provide an analog output representing the difference between the sensed fluid temperature and the reference or standard temperature while providing dynamic lead length compensation for the connecting circuit. A constant current source is precisely regulated and also selectively adjustable to provide a dual slope approximation of the temperature deviation range with respect to the corresponding probe resistance deviation range at the signal converter output. A monitor responds to malfunctions occurring within the system and calibration circuits permit quick and accurate calibration.

35 Claims, 4 Drawing Figures

PARAMETER COMPENSATING SYSTEM FOR A FLOWMETER

BACKGROUND OF THE DISCLOSURE

This invention relates to a parameter sensing system employed in a fluid flowmeter compensating system which responds to a metered output of a flowmeter to provide a compensated metered output relating to a preselected reference parameter for the fluid.

A large number of temperature compensating systems have been developed to temperature correct flowmeters such as, for example, translating a fluid flow pulse signal generated by a volume flowmeter or turbine meter at an existing or ambient temperature into an equivalent flow signal at a predetermined base or standard temperature. Such temperature corrective flow measurement systems are generally classified in the United States Patent Office in CLASS 73, MEASURING AND TESTING, SUB-CLASS 194, VOLUME OR RATE OF FLOW METER and in CLASS 235, REGISTERS, SUB-CLASS 151.34, CALCULATORS.

In the custody transfer of fluid products such as liquid petroleum, for example, it is important to accurately determine the volume of the transferred product at some standard reference parameter such as temperature, because the volume of an essentially non-compressible or moderately compressible product such as liquid petroleum increases as the product temperature increases. Thus the product volume, such as indicated by a metering device, must be corrected to the volume that the product would have at the reference temperature because the product in most instances will not be metered at the reference temperature. The reference temperature used for such custody transfers is usually 60° F in the United States, 15° C in Europe, and 68° F (20° C) in South America.

A number of temperature compensators or temperature compensating totalizers have been developed to respond to a metered output in the form of electrical pulses supplied from a metered transducer and to temperature information from a temperature sensing element immersed in the fluid flow near the meter. Such compensators generally correct such flow indicative pulses to provide a series of output pulses representing the volume that the product would have at the reference temperature which are counted and recorded. A number of compensating systems have employed an analog to digital converter responding to sensed temperature variations at a temperature probe through a signal converting circuit to provide a digital output to a modification circuit which, in turn, modifies the metered volumetric flow indicative pulses, such as in U.S. Pat. Nos. 3,905,229; 3,895,529; 3,862,405 and 3,823,310.

A number of errors may occur in providing an output signal to be used in temperature compensating and indicative of the difference between the actual temperature of the fluid and the reference temperature. For example, most temperature sensing probes display non-linearity in their resistance change with respect to temperature. In many situations, the signal converting circuitry is remotely located from the sensing probe thereby necessitating the employment of lengthy inter-connecting circuits. Variations in impedance in the leads within such inter-connecting circuits or cables can result in distorted temperature output signals. Leakage resistance occurring between cable leads or direct short circuits between the leads or to ground or an open circuited lead can also result in a distorted and improper temperature output to the modification circuitry. Ambient conditions surrounding the cable leads or an improper circuit connection to the temperature probe may also vary the temperature output signal to provide an erroneous input to the compensating system. Errors may also occur in the signal converting and connecting circuitry due to impedance changes of elements because of component aging or the improper calibration of the signal converting circuitry to conform to the nonlinearity between changes in fluid temperature and corresponding changes in probe resistance.

Additional errors may occur in the parameter sensing circuitry through variations in an energizing input. In addition, many temperature sensitive probes display differing resistivity characteristics at high temperatures as distinguished from lower temperatures which may also produce output errors where the signal converting circuitry does not distinguish between various ranges of temperature sensing and appropriately respond.

An improper operation may be overlooked in a situation where a malfunction in the temperature sensing and/or signal converting circuit has occurred resulting in the metered output being uncompensated or improperly compensated.

SUMMARY OF THE INVENTION

This invention relates to a parameter sensing system employed in a fluid flowmeter compensating system which responds to a metered output of a flowmeter to provide a compensated metered output relating to a preselected reference parameter for the fluid.

In one aspect of the invention, a sensing circuit provides a probe circuit sensing a parameter of the fluid and a reference circuit providing a preselected reference parameter. A circuit is connected to supply a constant energizing signal to the probe circuit and the reference circuit. A first signal is generated in response to the energization of the probe circuit and the reference circuit while a second signal is generated in response to the energization of one of the probe circuits or the reference circuit. An output operatively combines the first and second generated signals to provide an output signal varying in response to the relative difference between the sensed parameter of the fluid and the preselected reference parameter.

A signal converter is connected to the probe transducer and includes a source supplying a constant signal to the transducer and to a reference impedance having a preselected magnitude corresponding to the preselected reference parameter. The signal converter responds to signal variations at the reference impedance and at the probe to provide a variation responsive signal continually tracking the change in the sensed parameter with respect to the reference parameter.

The signal converter includes an amplifier having a first input operatively connected to the reference impedance and a second input operatively connected to the probe through the connecting circuitry while the signal converter output is operatively connected to the amplifier output and to the probe through the connecting circuitry.

The constant signal source of the signal converter is connected to the remotely located transducer through a first connecting circuit. A second connecting circuit connects the remotely located probe to the signal converter and provides an impedance which may be subjected to variations in response to extraneous environmental surroundings or ambient conditions. The signal converter provides an output signal indicative of the relative difference between the sensed fluid parameter and the preselected reference parameter and continually cancels erroneous signals due to impedance variations in the second connecting circuit.

The signal converter provides a highly responsive output in response to the difference of the sensed temperature and the reference temperature while continually cancelling erroneous signals due to impedance variations in the connecting circuits due to the proper selection of circuit components. For example, a reference resistor is selected to equal the resistance of the probe resistance at the reference temperature while the resistance of a selected pair of connecting leads are selected to be substantially equal. With such construction, the output of a third connecting lead does not have to be compensated for lead length variations.

The remotely located signal converter employs a series electrical circuit including the constant current output circuit and the reference resistor employing a resistance equal to the probe resistance at the predetermined reference temperature which, in turn, is connected to the probe resistor through a first connecting circuit. An operational amplifier having a substantially unity gain has a first high impedance input connected to the constant current output circuit and a second high impedance input connected to the probe resistance through a second connecting circuit. Such second connecting circuit is particularly connected to the probe resistor at the junction with the first connecting circuit. The operational amplifier output is connected to a first output circuit of the signal converter while a third connecting circuit having a resistance substantially equal to the resistance of the first connecting circuit is connected between the probe resistance and a second output circuit of the signal converter. With such construction, the signal converter continually tracks the change in the probe resistance with respect to the reference resistance and provides an analog signal at the first and second output circuits indicative of the relative difference between the sensed temperature of the fluid and the predetermined reference temperature. The signal converter also continually cancels erroneous signals due to resistance variations in the first and third connecting circuits.

The component values of the signal converting circuitry can be selected so that the analog signal appearing at the signal converting output provides a first relative polarity when the sensed temperature is greater than the reference temperature and a second relative polarity when the sensed temperature is less than the reference temperature.

The fluid flowmeter compensating system provides a unique method of calibrating its circuits to provide a highly responsive tracking at the output. Specifically, first and second simulated parameter elements differing in characteristics with respect to each other are selectively connected to the signal converter while the gain of the amplifier is varied to a predetermined setting to provide a first predetermined reading at a readout display connected to the signal converter output while the signal source is varied to provide a predetermined constant signal and a second predetermined reading at the readout display. A third simulated parameter element differing in characteristics from the first and second elements is selectively connected to the signal converter with the readout display being monitored for a third predetermined reading indicating a properly calibrated circuit.

The signal converter provides a unique construction in which a simulated probe impedance can be selectively connected in circuit to calibrate the converter output in accordance with a simulated fluid parameter. A digital to analog converter is connected to the signal converter output and responds to the analog signal thereat to provide a digital output at a readout display indicative of the analog signal. By employing the readout display, calibration can be readily accomplished by selectively connecting a simulated probe impedance to the signal converter and the off-set adjust circuit for the operational amplifier selectively varied to provide a predetermined reading at the readout display. Furthermore, a simulated probe impedance can be connected to the output of the constant signal source and to the signal converter output and the signal source selectively adjusted to provide a predetermined constant signal as detected at the readout display. In such manner, the signal converter is easily calibrated without requiring external measuring equipment or the like. By choosing proper impedance elements simulating a plurality of parameter conditions for the fluid, the circuit can be conditioned to closely approximate the actual temperature deviations of the sensed fluid. The third simulated parameter element may be used to provide an indication of proper calibration and correct functioning of the signal converting circuitry.

A malfunction alarm uniquely responds to a sensing circuit including the probe transducer and the signal converter to provide a malfunction warning.

The malfunction alarm responds to the analog output provided by the signal converter and is responsive to the relative difference between the sensed parameter of the fluid and the preselected reference parameter. The malfunction alarm responds to provide a first output during a normal sensing sequence and a second output different than the first output to provide a malfunction warning in response to the sensed malfunction within the system. The malfunction alarm monitors a remote circuit including first and second leads within the connecting circuit which are connected to the probe. A malfunction alarm thus responds to provide the second output in response to an open circuit or short circuit occurring within such remote circuit. The alarm will also provide a second output whenever the signal converter output exceeds a predetermined magnitude or in response to an intermittent power failure. In the event of such power failure, the re-application of power will saturate the operational amplifier and the malfunction alarm will transfer to the second output.

The malfunction alarm responds to the signal converter through a digital to analog converter and is connected to its output. In one aspect of the invention, the malfunction alarm is connected to one of the digital outputs which signifies that the analog signal supplied from the signal converter exceeds a predetermined magnitude. In another aspect, the malfunction alarm is connected to an overload output of the digital to analog converter and responds to an indication that the analog signal is exceeding a predetermined magnitude which overloads the system.

The malfunction alarm includes a switching circuit which operates from a first condition to a second condition to actuate a malfunction warning signal. The switching circuit provides a manually resettable latch which maintains the second condition until manually reset thereby bringing the malfunction to the attention of personnel.

The constant current source provides a highly regulated constant current output by utilizing a regulator to supply a constant current to a Zener diode to provide a stabilizing reference signal at a reference input of a control operational amplifier having a second input monitoring the constant current output. Such regulator may comprise a voltage regulator operating as a current sink to provide a precise regulation to the constant current source.

The constant current source can also be selectively controlled to provide a first predetermined constant current to the probe transducer when the sensed parameter is greater than the reference parameter and a second predetermined constant current different than the first current in response to the sensed parameter being less than the reference parameter. In a preferred form of the invention, a control amplifier within the constant current source provides a feedback input connected to respond to the first and second constant current outputs and a reference input. Such reference input receives a first predetermined reference signal in response to the sensed parameter being greater than the reference parameter to provide the first predetermined constant current and a second predetermined reference signal different than the first predetermined reference signal in response to the sensed parameter being less than the reference parameter to provide the second predetermined constant current. The first and second reference signals are operatively provided in response to the output of the analog to digital converter which, in turn, responds to the analog output provided by the signal converter. In a preferred construction, the first predetermined constant current is provided in response to the analog output of the signal converter having a first relative polarity and providing the second predetermined constant current in response to the analog output having a second relative polarity different than the first polarity.

The flowmeter compensating system employing the parameter sensing system of the invention provides a highly accurate sensing and signal converting construction and provides an extremely accurate output signal indicative of the deviation between the sensed fluid temperature and the reference temperature which may be utilized by any one of a number of modification circuits such as in the previously mentioned patents, for example, to provide a compensated metered output relating to the preselected reference parameter.

BRIEF DESCRIPTION OF THE DRAWINGS

The drawings furnished herewith illustrate the preferred construction of the present invention in which the above advantages and features are clearly disclosed as well as others which will be clear from the following description.

In the drawings.

DESCRIPTION OF THE PREFERRED ILLUSTRATED EMBODIMENT

Figures 1, 3:
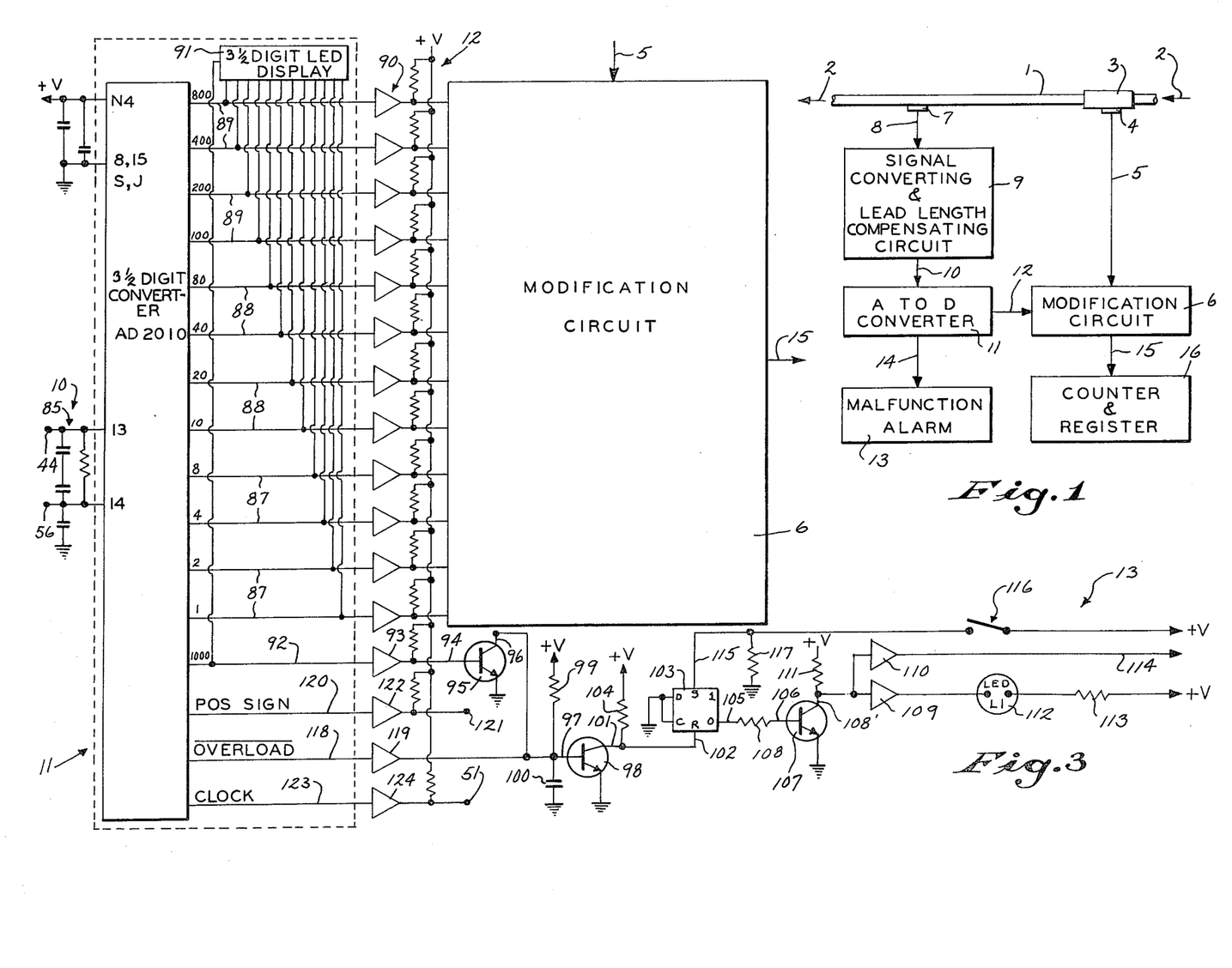
FIG. 1 is a block diagrammatic illustration showing a fluid flow monitoring system which temperature compensates the output of a fluid flow responsive transducer.
FIG. 3 is an electrical circuit schematic showing a digital to analog converter connected to a malfunction alarm circuit and to a block diagrammatic illustration representing a modification circuit.

Referring to the drawings and particularly FIG. 1, a pipe line 1 conducts a fluid in the direction 2 which is monitored by a flowmeter 3. The flowmeter 3 measures the rate of fluid flow and employs a pulse producing volumetric flow transducer 4. The flowmeter 3 employing transducer 4 may comprise a turbine flowmeter, a positive displacement flowmeter, a vortex shedding flowmeter, or other suitable flow transducer of the type which produces a train of discrete pulses proportional to the volumetric fluid flow therethrough. An output circuit 5 connects the flow transducer 4 to a modification circuit 6.

A temperature responsive sensor 7 is connected to the pipe line 1 which may be located either upstream or downstream from the flowmeter 3. An output circuit 8 connects the temperature probe 7 to a signal converting and lead length compensating circuit 9. An output circuit 10 connects the converting and compensating circuit 9 to an analog to digital converter 11 which, in turn, is connected through a circuit 12 to the modification circuit 6. A malfunction alarm 13 is connected through a circuit 14 for responding to the output of the analog to digital converter 11 and responds to a malfunction within the system to provide a warning. The modification circuit 6 responds to the volumetric flow indicative pulses supplied from transducer 4 and to a binary (BCD) input from the analog to digital converter 11 to provide a modified pulse train at an output circuit 15 corresponding to volumetric fluid flow at a standard reference temperature. The modified pulse train at output 15 is counted and displayed as illustrated at 16.

Figure 2:
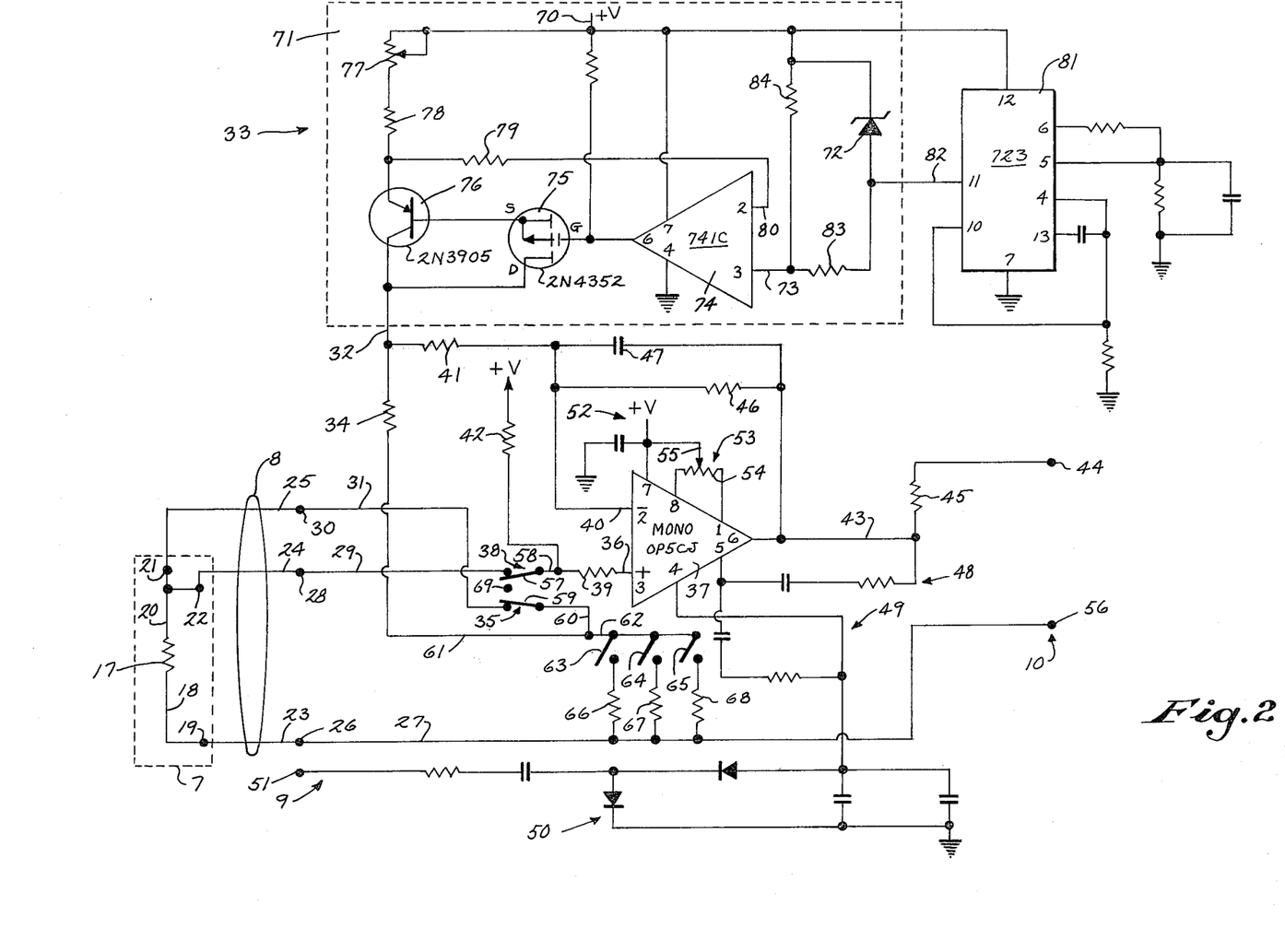
FIG. 2 is an electrical circuit schematic showing a temperature responsive probe connected to a signal converting and lead length compensating circuit.

The temperature probe 7 includes a temperature sensitive resistance element 17 which may comprise a platinum temperature sensitive measuring resistor. The resistor 17 provides an output circuit 18 connected to an output terminal 19 and an output circuit 20 connected to an output terminal 21 and an output terminal 22.

The circuit 8 provides an insulated cable including a plurality of leads. Specifically, a lead 23 is connected to terminal 19, a lead 24 is connected to terminal 22 and a lead 25 is connected to terminal 21. In many applications, the temperature probe 7 is remotely located from the signal converting and compensating circuit 9 and may extend for several miles. The extended cable 8 including leads 23–25 is therefore exposed to various environmental influences such as the sun and other surroundings which may vary the resistivity of such leads because of changing ambient conditions.

The lead 23 of cable 8 is connected through a terminal 26 to a lead 27, the lead 24 is connected through a terminal 28 to a lead 29, and the lead 25 is connected through a terminal 30 to a lead 31.

An output circuit 32 is provided by a constant current source 33 having an adjustable current and is connected to the lead 31 through a reference resistor 34 and a normally closed switch 35. The input lead 29 is connected to a non-inverting input 36 of an operational amplifier 37 through a normally closed switch 38 and a resistor 39. The output circuit 32 of the constant current source 33 is also connected to an inverting input 40 of the operational amplifier 37 through a resistor 41. The lead 29 is also connected to a positive constant potential voltage source +V through a very high impedance resistor 42 and the switch 38.

The operational amplifier 37 is selected to provide high precision in amplification while having a low drift characteristic and requiring low bias currents. Such an operational amplifier is commercially available from Precision Monolithic, Inc. under the brand name MONO OP5CJ. An output 43 from the operational amplifier 37 is connected to an output terminal 44 through a resistor 45 and is also connected to the input 40 through a parallel connected circuit including a resistor 46 and a smoothing capacitor 47. A feedback circuit 48 provides added stability to the amplifier 37 while operating negative voltage is supplied to the amplifier through the circuit 49. The circuit at 49 includes a half-wave rectifying circuit 50 coupled to receive clock pulses received from the analog to digital converter 11 through an input terminal 51. Operating power for the operational amplifier 37 is also supplied through a circuit 52 including a zero adjust circuit 53 providing a variable potentiometer 54 connected between pins 1 and 8 of operational amplifier 37 and having a variable tap 55 connected to a positive constant potential voltage source +V.

The lead 27 is connected to an output terminal 56 with output terminals 44 and 56 providing a portion of the connecting circuit 10 joining the converting and compensating circuit 9 with the analog to digital converter 11.

The system provides calibration circuits including the normally closed switch 38 providing a selectively operable contact arm 57 permanently electrically connected to the resistor 39 through a circuit 58. The calibration circuits also include the normally closed switch 35 which likewise provides a selectively operable contact arm 59 which is permanently electrically connected to the resistor 34 through the electrical circuits 60 and 61 and also connected to a calibration circuit 62. The calibration circuit 62 includes three normally open, selectively operable electrical switches 63, 64 and 65 which may be selectively closed to form an electrical circuit between the calibration circuit 62 and the output terminal 56 through one of a series of resistive elements 66, 67 or 68, respectively. For the purposes of illustration, the calibration resistor 66 may be selected to provide a resistance corresponding to a calibrating temperature of 0° F, resistor 67 may be selected to provide a resistance corresponding to a calibration temperature of 60° F, and resistor 68 may be selected to provide a resistance corresponding to a calibration temperature of 120° F. The calibration circuits also include a terminal 69 which functions as an electrical connector so that the opening of contact arms 57 and 59 will complete an electrical circuit between leads 58 and 60 while providing an open circuit to leads 29 and 31. The switches 35, 38, 63, 64 and 65 could, of course, be replaced by selectively removable jumper plugs or connectors and provide the identical functions.

The constant current source 33 includes an input circuit 70 which is connected to a positive D.C. voltage source +V and functions to provide a highly regulated constant current output at lead 32 of a preselected value. The circuitry shown in the dotted area 71 constitutes a conventional constant current source which employs a temperature compensated Zener diode 72 to establish a substantially constant voltage at a non-inverting input 73 of an operational amplifier 74. The output of operational amplifier 74 drives a field effect transistor (FET) 75 which, in turn, drives a PNP type transistor 76. With transistor 76 conducting, a circuit is completed from the positive D.C. voltage source through input 70, a variable calibration resistor 77, a fixed resistor 78, the conducting transitor 76 to the constant current output lead 32. A feedback circuit is connected from the emitter circuit of transistor 76 through a resistor 79 to an inverting input 80 of operational amplifier 74. In a conventional operation, the ampifier 74 will continue to provide a changing output until the voltage at input 80 varies to become substantially equal to the voltage at input 73. The constant current source 71 thus is self-regulating to provide a constant current at output lead 32 as established by the reference voltage at the input 73 as regulated by the Zener diode 72.

In order to improve the accuracy of the constant current source 71 and thereby improve the accuracy and operation of the overall converting and compensating circuit 9, a constant current source 81 is employed in combination with the Zener diode 72 to provide an extremely stable reference voltage at input 73 of amplifier 74 irrespective of the instability of the positive constant potential voltage source +V supplied at input 70. Specifically, an output circuit 82 of the source 81 is connected to an anode circuit of Zener diode 72 and to the input 73 of operational amplifier 74 through a resistor 83. In such construction, the input 73 is connected at the connection between the resistor 83 and a resistor 84 forming a voltage divider relationship which is parallel connected with the Zener diode 72. The voltage regulator 81 may employ a commercially available component such as a Fairchild uA723 voltage regulator which provides an internal reference source and an operational amplifier operating as a current sink.

The analog to digital converter 11 is connected to receive the output signal from terminals 44 and 56 through a coupling circuit 85 which is employed for noise suppression. The analog to digital converter 11 may consist of a 12 bit converter and selected from commerically available digital panel meters such as marketed by Analog Devices under the designation AD2010, for example. In any event, four output circuits illustrated at 87 provide a binary (BCD) output which represents the lowest significant digital bit. The four output circuits illustrated at 88 provide a binary output representing an intermediate significant digital bit while the output circuits illustrated at 89 provide a binary output representing the most significant digital bit supplied to the modification circuit 6. The bits 87–89 thus represent in binary (BCD) digital form the analog signal supplied to the input circuit 10. The binary output leads 87 through 89 are connected to buffers illustrated at 90 provided by the coupling circuit 12 which, in turn, are connected to the modification circuit 6. Each of the individual binary outputs 87 through 89 are also connected to a 3 ½ digit light emitting diode (LED) display 91 to provide a direct readout of the digital signals being processed by the analog to digital converter 11.

A binary output lead 92 is also provided by the analog to digital converter 11 and represents the highest significant digital bit which is greater than the digital bit represented by the binary output at 89. The binary output 92 is operative to signal either an excessive temperature deviation existent at the probe 7 or a malfunction in the connecting circuitry 8, probe 7, or the operating circuitry 9. The binary output 92 is connected through a buffer amplifier 93 to a base input circuit 94 of an NPN type transistor 95 provided by the malfunction alarm circuitry 13. The emitter circuit of transistor 95 is coupled to the system neutral while a collector circuit 96 is connected to a base input circuit 97 of an NPN type transistor circuit 98. The base circuit 97 of transistor 98 is also connected to a positive constant potential voltage source +V through a resistor 99 and connected to the system neutral through a capacitor 100. An emitter circuit of transistor 98 is coupled to the system neutral while a collector circuit 101 is connected to a reset input 102 of a "D" type flip-flop 103. The collector circuit 101 is also connected to a positive constant potential voltage source +V through a resistor 104. The D-C inputs of flip-flop 103 are connected to the system neutral while a logic "0" output 105 is connected to a base circuit 106 of an NPN type transistor 107 through a resistor 108. An emitter circuit of transistor 107 is connected to the system neutral while a collector circuit 108' is connected to an input circuit of a buffer amplifier 109 and to an input circuit of a buffer amplifier 110. The collector circuit 108' is also connected to a positive constant potential source +V through a resistor 11. The output circuit of the buffer amplifier 109 is connected to a positive constant potential voltage source +V through a light emitting diode (LED) 112 and a resistor 113. An output circuit 114 provided by the buffer amplifier 110 may be connected to a relay circuit or other electromechanical output employed as an auxiliary alarm output.

A set input 115 for the "D" flip-flop 103 is connected to a positive constant potential voltage source +V through a normally open push button switch 116 and is also connected to the system neutral through a resistor 117.

The analog to digital converter 11 also provides an overload output at lead 118 which indicates that a signal of excessive magnitude has been applied at input terminals 44-56. The overload output 118 is connected to the base input circuit 97 of the transistor 98 through a buffer amplifier 119. A polarity indicative output 120 is provided by the analog to digital converter 11 and provides a logic signal corresponding to the relative polarity existent between the input terminals 44 and 56. Such logic signal is applied to an output terminal 121 through a buffer amplifier 122. The analog to digital converter 11 also provides a clock output at a lead 123 which is connected to the converting and compensating circuit 9 through a connecting terminal 51 and a buffer amplifier 124 to provide operating power to the operational amplifier 37.

Figure 4:
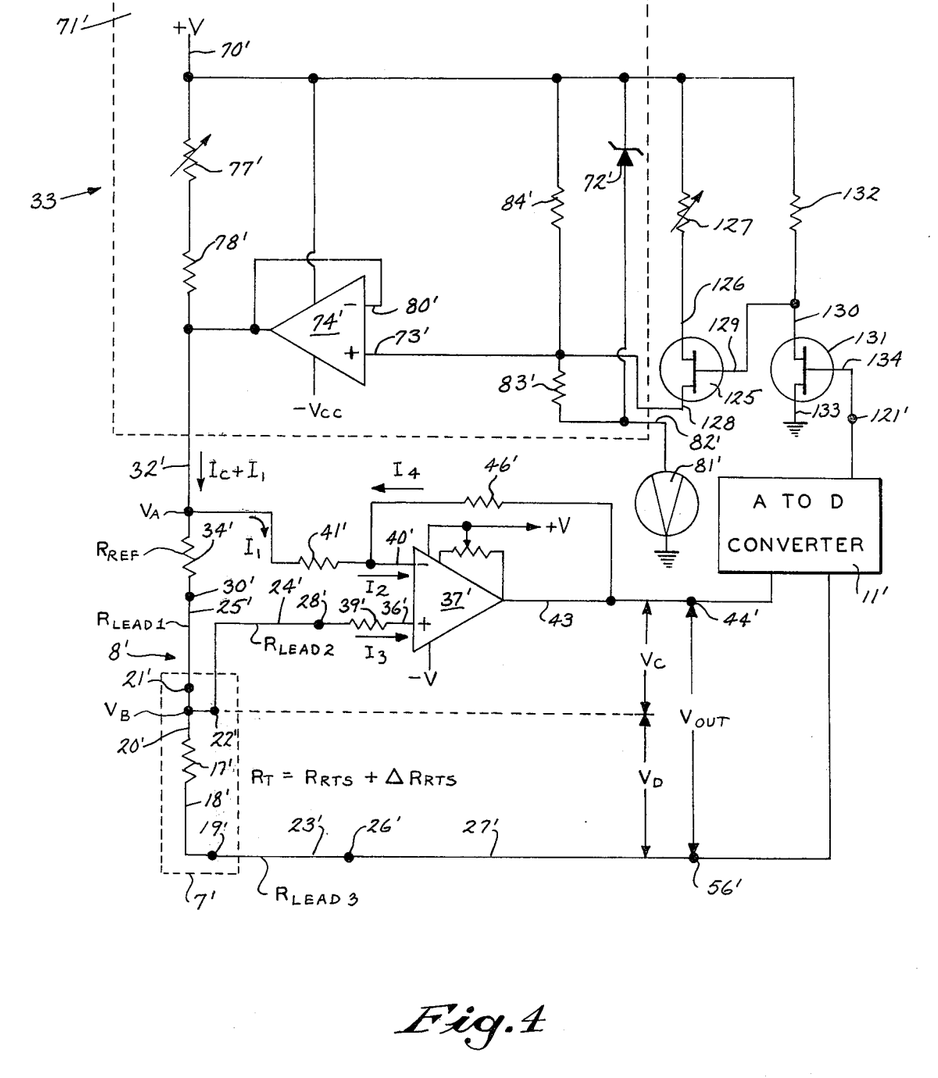
FIG. 4 is an alternative construction for the signal converting and compensating circuit of FIG. 2 operative with the digital to analog converter of FIG. 3.

FIG. 4 represents a modification to the circuits illustrated in FIGS. 2 and 3 and various circuit elements therein have been omitted for the sake of brevity. In addition, elements illustrated in FIG. 4 which correspond to elements shown in FIGS. 2 and 3 will be identified by identical numbers primed and need not be discussed further. A field effect transistor (FET) or analog switch 125 provides a drain circuit 126 connected to the source lead 70' through a selectively variable resistor 127 and a source circuit 128 connected to the input 73' of the operational amplifier 74'. A base circuit 129 of FET 125 is connected to a drain circuit 130 of an FET or analog switch 131. The drain circuit 130 of FET 131 is also connected to the source lead 70' through a resistor 132 while a source circuit 133 is connected to the system neutral. A base circuit 134 of FET 131 is connected to the terminal 121' provided by the analog to digital converter 11'. The switches 125 and 131 may constitute commercially available components such as marketed by Motorola as MC 14016.

In operation, the signal converting and compensating circuit 9' responds to the output of the temperature probe 7' and provides an analog output at the terminals 44' and 56' of the connecting circuit 10' which is proportional to the change of temperature of the fluid flowing in pipe line 1 with respect to a standard or reference temperature, such as 60° F, for example. Even though the cable circuit 8' may extend for thousands of feet and maybe up to several miles, the converting and compensating circuit 9' compensates the output supplied to circuit 10' for variances in the signal received from probe 7' which may be caused by environmental influences. For example, a decrease or increase in temperature at the leads within cable 8' would correspondingly vary the resistance thereof and varied signals would be supplied to the converting circuit 9' from the probe 7' which would not accurately indicate the temperature of the flowing fluid in pipe line 1. Not only does the converting and compensating circuit 9' compensate for circuit parameters of the cable leading from the temperature probe due to environmental influences or the like, but further provides extreme accuracy in developing an output signal which is a function of the difference between the actual temperature sensed by probe 7' and the standard reference temperature.

In order to provide an example of operation, reference will be made to the simplified diagram illustrated in FIG. 4 for the sake of simplicity and understanding. As previously discussed, the probe 7' consists of a platinum temperature sensitive resistive element 17' which displays an actual resistance designated as $R_T$ which may be characterized as its resistance at a standard reference temperature designated $R_{RTS}$ plus the change of resistance from such reference resistance due to either increased or decreased sensed temperature which may be designated $\Delta R_{RTS}$. The resistance of lead 25' between terminals 21' and 30' will be designated $R_{LEAD\ 1}$; the resistance of lead 24' between terminals 22' and 28' will be designated $R_{LEAD\ 2}$ and the resistance of lead 23' between terminals 19' and 26' will be designated $R_{LEAD\ 3}$. The resistance of the reference resistor 34' will be designated $R_{REF}$. The constant current flowing through lead 32' will be designated $I_C + I_1$. The current at the inverting input 40' of amplifier 37' will be designated $I_2$ while the current at the non-inverting input 36' will be designated $I_3$ and the current flowing through the feedback circuit of amplifier 37' will be designated $I_4$. The voltage $V_A$ is taken at the input lead 32' while the voltage $V_B$ is taken at the connecting junction between terminals 21' and 22'. The voltage $V_D$ is taken between the output terminal 22' provided by probe 7' and the output terminal 56' provided by the converting and compensating circuit 9'. The voltage $V_C$ is taken between the output terminal 22' by probe 7' and the output terminal 44' provided by the converting and compensating circuit 9'. The voltage $V_B$ represents the virtual ground for the operational amplifier 37' which has a closed loop gain of $-(R_{46'}/R_{41'}) = -1$. In that the impedance of resistors 39' and 41' are substantially greater than the lead length resistances of leads 24' and 25', the resistance of the reference resistor 34' and the resistance of the temperature probe 17', the input bias current $I_2$ and $I_3$ are small compared to the currents $I_C$ and $I_1$ and may therefore be neglected for circuit analysis purposes. Thus to solve for the equation $V_{OUT}$ and assuming $I_2 = I_3 = 0$:

$$V_{OUT} = V_C + V_D \tag{1}$$

$$V_C = -(R_{46'}/R_{41'})(V_A - V_B) = I_C(R_{REF} + R_{LEAD\ 1}) \tag{2}$$

$$V_D = I_C(R_{RTS} + \Delta R_{RTS} + R_{LEAD\ 3}) \tag{3}$$

Substituting equations (2) and (3) into equation (1):

$$V_{OUT} = -I_C(R_{REF} + R_{LEAD\ 1}) + I_C(R_{RTS} + \Delta R_{RTS} + R_{LEAD\ 3}) \tag{4}$$

P If $R_{REF}$ is made equal to the probe resistance $R_{RTS}$ and the resistance $R_{LEAD\ 1}$ of lead 25' made equal to the resistance $R_{LEAD\ 3}$ of lead 23' by employing the same wire size and length:

$$V_{OUT} = I_C(\Delta R_{RTS}) = I_C(R_T = R_{REF}) \tag{5}$$

With proper zero off-set adjustment of amplifier 37', $V_{OUT}$ will be positive when the sensor resistance $R_T$ exceeds $R_{REF}$ and negative when $R_T$ is less than $R_{REF}$. With such construction, the voltage output $V_{OUT}$ displays a highly accurate proportionality to the change in temperature experienced by the sensor resistance 17' of probe 7'. The effect of lead resistance and particularly the effect of variances of lead resistance due to environmental influences or other factors has no effect on the accuracy of $V_{OUT}$. The converting and compensating circuit 9 thus dynamically compensates for variances in circuit parameters experienced by the leads within cable 8.

The converting and compensating circuit 9 accurately converts sensed changes in impedance at the probe 7 into an output voltage $V_{OUT}$ which proportionately represents deviations in temperature at the probe from a standard or reference temperature. As one example of operation, the components of circuit 9 can be selected and adjusted so that an increase of 100° F above the reference temperature would provide +100 millivolts at $V_{OUT}$ while a 100° F decrease in fluid temperature below the reference temperature would result in −100 millivolts at $V_{OUT}$. With the fluid at the reference temperature, $V_{OUT}$ would be 0.

The operational amplifier 37' uniquely senses the varying voltage between $V_A$ and $V_B$ which includes the series circuit of the reference resistor 34' ($R_{REF}$) and the lead 25' ($R_{LEAD\ 1}$) and maintains the voltage $V_C$ constant except when $R_{LEAD\ 1}$ changes. Because the operational amplifier 37' together with the resistors 39' and 41' present a high input impedance, any variances in impedance of lead 24' ($R_{LEAD\ 2}$) due to environmental influences or the like has no effect on the operation of amplifier 37' or of the circuit 9'.

While the operation of the converting and compensating circuit 9 has been discussed above with reference to the simplified diagram of FIG. 4, it is understood that such description would also apply to the circuit construction illustrated in FIG. 2.

The output applied at terminals 44 and 56 representing the sensed differential temperature, which is proportional to the temperature difference between the sensed fluid temperature and a reference temperature, is supplied through the coupling circuit 10 to the analog to digital converter 11 illustrated in FIG. 3. The analog voltage signal supplied at the coupling circuit 10 is converted by the three and one-half digit A-D converter into a binary (BCD) coded digital output which is supplied through the buffers 90 provided by the coupling circuit 12 to the modification circuit 6.

In operation, the analog to digital converter 11 responds to a predetermined range of input voltage at terminals 44 and 56 to provide the binary coded decimal digital output at 12. When the absolute magnitude of input voltage at terminals 44 and 56 exceeds the predetermined range or voltage, the outputs 87, 88 and 89 will all display logic "0" outputs to the modification circuit 6 which thus ceases to correct or compensate the incoming pulses supplied on circuit 5. As an example of operation, the A to D converter 11 may be designed to respond to a range of input voltage at terminals 44–56 of plus or minus 99.9 millivolts corresponding to a temperature deviation range of plus or minus 99.9° F at the probe 7 with respect to the reference temperature.

When the voltage input at terminals 44 and 56 exceeds the predetermined range, such as 99.9 millivolts for example, the digital to analog converter 11 will provide a logic "1" output at lead 92 which is supplied to the base circuit 94 of transistor 95 through the buffer amplifier 93. The transistor 95 responds to logic "1" at its base input to turn "ON" thereby turning transistor 98 "OFF." With transistor 98 in the "OFF" condition, a resetting signal is applied to input 102 of the "D" flip-flop 103 which, in turn, changes state at output 105 to supply a logic "1" signal to the base circuit of transistor 107. With transistor 107 in the "ON" condition, a circuit is completed from the positive constant potential voltage source +V through the light emitting diode (LED) 112 and amplfier 109 so that the LED 112 will signal a malfunction condition in response to the input voltage condition existing at the input terminals 44–56. The excessive voltage condition slightly above the predetermined range of the A to D converter 11 could be indicative of an excessive temperature deviation at the probe 7 or could also indicate a malfunction within the connecting circuit 8, probe 7, or circuit 9. In any event, the signal provided by LED 112 warns an operator at a location remote from probe 7 that the metering readout at 16 of the fluid flow through pipe line 1 may be inaccurate because of an excessive temperature deviation of the measured fluid or because of malfunctioning within the converting and compensating circuit 9. After the malfunction alarm 13 is activated, an operator is required to manually reset the D-C flip-flop 103 by closing switch 116 thereby supplying a set signal to input 115 to change the state of the "D" flip-flop 103.

In the situation where a large excessive voltage differential appears at the input terminals 44 and 56, the digital to analog converter 11 will supply logic "0" signals to the outputs 87, 88 and 89 as well as to the output lead 92 in which event the transistor 95 will not turn "ON" to activate the LED 112. In such event of an excessively large voltage differential, the A to D converter 11 will supply a logic "0" signal at the output lead 118 indicating an overload condition, such as an input voltage differential at terminals 44–56 of 200 millivolts for example. The logic "0" overload signal at lead 118 is applied to the base circuit 97 through the buffer amplifier 119 thereby turning the transistor 98 "OFF." The transistor 98 thus operates as previously described so that the light emitting diode 112 is energized to provide a signal indicating a malfunction in the system.

The malfunction alarm 13 can respond to a number of various circuit malfunctions such as short circuits or open circuits which tend to indicate temperature deviations at the temperature probe 7 beyond the predetermined range of the digital to analog converter 11. For example, a short circuit between certain of the leads within cable 8 would represent an extremely low resistance to the converting and compensating circuit 9 and therefore would appear as an extremely high temperature, well above the predetermined limitation of temperature deviation from the standard or reference temperature. In such case, the overload output at 118 of the digital to analog converter 11 would issue a logic "0" signal to activate the malfunction alarm 13 by energizing the light emitting diode 112. An open circuit of one of the leads within cable 8 would indicate an infinite resistance indicating an extremely low temperature, well below the predetermined limitation of deviation from the standard or reference temperature resulting in the digital to analog converter 11 issuing a logic "0" signal at lead 118 to energize the LED 112.

The malfunction alarm 13 also uniquely responds to a power failure condition. Following a power failure, electrical energy is re-applied to the converting and compensating circuit 9. Upon the initial application of power, the operational amplifier 37 will initially saturate because of the application of the positive constant potential voltage source +V through resistor 42 to the non-inverting input 36. The operational amplifier 37 will thus provide an output voltage at terminal 44 which greatly exceeds the voltage at terminal 56 thereby indicating an overload condition so that the digital to analog converter 11 will provide a logic "0" at output 118 to actuate the probe alarm 13. In such situation, an operator will become aware of a malfunction condition, namely the intermittent power failure and subsequent restoration, and be aware that possible improper monitoring or metering has taken place and that corrective action may be required.

The accuracy of the converting and compensating circuit 9 is enhanced by the supply of a highly regulated constant current input at lead 32. The use of a current regulator 81 is connection with the constant current source 71 permits the employment of a poorly regulated positive constant potential voltage source +V at the input lead 70. With such construction and operation, the current regulator 81 maintains a precisely defined constant current through the temperature compensated Zener diode 72 to maintain a highly accurate fixed reference voltage at the non-inverting input 73 of the operational amplifier 74. The accuracy of this constant fixed reference voltage at input 73 is maintained even though variations may exist in the positive constant potential voltage source +V at 70.

The converting and compensating circuit 9 provides a unique construction and method of calibrating the system without requiring external measuring equipment or major modifications to the circuitry. Such calibration of the converting and compensating circuit 9 is readily accomplished by using the analog to digital converter 11 by employing the readout display 91.

In the calibration mode or sequence of operation, an operator will open switches 57 and 59 so as to mutually electrically contact terminal 69 thereby providing a complete electrical circuit including leads 60, switch arm 59, terminal 69, switch arm 57, and lead 58 thereby connecting the constant current input lead 32 to the non-inverting input 36 of the operational amplifier 37. Switch 64 is thereafter closed to connect resistor 67 in circuit to simulate a probe temperature corresponding to the reference temperature. With switch 64 closed, the constant current lead 32 is connected in circuit through resistors 34 and 67 to the output terminal 56. With the simulated reference temperature resistor 67 in circuit, the tap 55 of the zero adjust potentiometer 53 is selectively varied until the potential difference between output terminals 44 and 56 is zero as indicated by the output display 91 of the analog to digital converter 11. With the output circuit 10 adjusted to provide a zero differential output, the switch 64 is opened and switch 65 closed to connect resistor 68 in circuit to simulate a second predetermined temperature condition greater than the reference temperature. The resistor 77 is thereafter selectively adjusted until the voltage difference at terminals 44 and 56 correspond to the simulated temperature differential existing between the simulated second predetermined temperature condition and the reference temperature, as determined by the readout at 91 provided by the digital to analog converter 11. If desired, the instructional manual for such calibration technique may advise an operator to adjust resistor 77 to permit a slight deviance from the exact differential of simulated temperature from the reference temperature to further adjust the output at 10 for non-linearity known to exist within the particular temperature probe 7 being employed. Following the adjustment of resistor 77 to provide proper calibration at the predetermined simulated temperature above the reference temperature, switch 65 is opened and switch 63 is thereafter closed to connect the resistor 66 in circuit. The insertion of resistor 66 in circuit simulates a predetermined temperature below the reference temperature and an operator will check the readout provided by display 91 of the analog to digital converter 11 to determine whether the reading corresponds to the expected deviation between the simulated predetermined temperature provided by resistor 66 and the reference temperature. If an improper reading is detected with resistor 66 in circuit during the third step of the calibrating sequence, an operator will be aware of a possible malfunction or miscalibration condition within the converting and compensating circuit 9. During the calibration sequence with switch arms 57 and 59 open, the temperature probe 7 is electrically disconnected from the converting and compensating circuit 9. Following the calibration sequence, switch arms 57 and 59 are closed thereby electrical re-connecting the probe 7 into the circuit operation.

Under ideal conditions, it would be desirable to obtain a temperature probe 7 having a resistance 17 which varies absolutely linearly with respect to changes in sensed temperature. In reality, all temperature probes have varying degrees of non-linearity. For highly accurate results, it is desirable to design the converting and compensating circuit 9 so as to provide an output response which substantially follows or approximates the non-linear characteristics of the temperature probe 7. In other words, it is desirable to design the circuit 9 to provide an output closely approximating the actual non-linear response of the probe resistance versus temperature characteristic over a predetermined range of temperatures (the temperature span) which are commonly experienced in actual operation.

It has been found that the change of sensed output voltage responding to a change of temperature displays a different characteristic when temperature is below the standard or reference temperature than when the temperature is above the reference temperature. In a platinum probe, for example, the non-linearity error is essentially parabolic about the reference temperature. For additional accuracy which may be particularly beneficial with certain extremely non-linear probes, it may be desirable to provide added compensation within the circuit 9 which is responsive to sensed probe temperature deviating either above or below the reference temperature. One possible compensating construction is illustrated in FIG. 4 wherein the constant current provided at lead 32' is established at a first predetermined constant magnitude when the temperature is at or above the reference temperature and is established at a second predetermined magnitude when the sensed temperature is below the reference temperature.

When the sensed temperature at the probe exceeds the reference temperature, the analog to digital converter 11 will provide a logic "1" output at terminal 121 (121' in FIG. 4) which is applied to the base 134 of the FET 131. The FET 131 will therefore turn "ON" and render the FET 125 non-conductive or turned "OFF" and operatively remove the variable resistor 127 from the input circuit 73' of amplifier 74'. Thus in the over temperature condition, the constant current source 33' will operate in a manner as previously described with respect to the circuits illustrated in FIG. 2.

When the sensed temperature at the probe decreases below the reference temperature, the digital to analog converter 11 will provide a logic "0" output at terminal 121 which will render the FET 131 non-conductive or turned "OFF" thereby turning "ON" the FET 125. In such mode, the variable resistor 127 is connected in circuit to decrease the reference voltage at input 73' of operational amplifier 74' to a second predetermined value which correspondingly decreases the constant current supplied to output circuit 32' to a second predetermined magnitude. The decreased constant current supplied to circuit 32' in response to the sensed probe temperature decreasing below the reference temperature appropriately compensates the response of the converting and compensating circuit 9 for the differing probe characteristics with respect to changing resistivity for temperature changes below the reference temperature as distinguished from changes in resistivity at temperatures above the reference temperature. Such a selective response provides, in effect, a dual slope approximation of the differing non-linearity of the probe resistance varying in accordance with temperatures above and below the reference temperature.

The circuit illustrated in FIG. 4 can readily be adjusted prior to a metering sequence so as to provide an output which closely approximates the actual variances in electrical characteristics of the temperature probe at temperature deviations above and below the reference temperature. For example, the circuit 9 is conditioned to respond to a predetermined temperature deviation above the reference temperature, such as adding resistor 68 to the circuit as previously discussed with respect to FIG. 2, and resistor 77' adjusted as previously described until the voltage output at terminals 44–56 corresponds to a magnitude correlating to such temperature deviation as detected by the readout 91 provided by the digital to analog converter 11. Thereafter, the circuit 9 is conditioned to respond to a predetermined temperature deviation below the reference temperature, such as by adding resistor 66 to the circuit as previously described with respect to FIG. 2, and resistor 127 adjusted until the voltage output at terminals 44–56 corresponds to a magnitude correlating to such temperature deviation as detected by the readout 91 provided by the digital to analog converter 11.

The operation of the converting and compensating circuit 9 in conjunction with the analog to digital converter 11 provides a highly accurate response to sensed temperature deviations in the fluid flowing through pipe line 1 with respect to a standard or reference temperature. The binary coded decimal digital readout supplied by the A to D converter 11 through the circuit 12 represents an extremely accurate sensed deviation of temperature from the standard or reference temperature which may be conveniently used by the modification circuit 6 to modify or correct the output supplied by transducer 4 before being applied to the counter and register 16.

The modification circuit 6 may employ any one of a number of well known techniques such as illustrated in the patents previously mentioned herein to modify the pulse train supplied by circuit 5 which may include pulse multipliers, pulse dividers, or other circuits which are operative to respond to the series of input pulses supplied at circuit 5 and provide a series of output pulses at 15 which are proportionately modified in response to the binary inputs supplied by the analog to digital converter 11. The modification circuit 6 thus supplies an output at circuit 15 which represents the volumetric fluid flow as if the metering of the fluid occurred at the standard or reference temperature. Such modification thus accurately compensates for volume differences due to temperature changes from the standard or reference temperature. The modification circuit 6 can also provide added compensation for the fluid temperature coefficient of expansion and for the flowmeter correction factor. As an example, the modification circuit 6 will solve the equation $P_O = P_N K_M (1 - \Delta T \alpha)$ where $P_O$ represents the frequency of compensated output pulses at the output circuit 15, $P_N$ represents the frequency of uncompensated input pulses at the connecting circuit 5, $K_M$ represents the flowmeter correction factor, $\alpha$ represents the fluid temperature coefficient, and $\Delta t$ represents the BCD output at 12 supplied from the A to D converter 11.

The system provides a highly accurate output without requiring an extensive and expensive circuit construction. The system uniquely provides continuous dynamic compensation for changes in the electrical characteristics of the circuits leading to the remotely located temperature probe and further provides a unique construction for determining the difference between the actual temperature of the measured fluid and the reference temperature. The system provides a structure which can be easily calibrated without requiring additional measuring equipment or major circuit changes and also employs a method in which circuit malfunctions can be readily detected. The system also provides a unique construction for providing a highly regulated electrical input, such as a constant current, even though the power source input deviates or varies. The system also responds to the monitoring of the sensed temperature above and below the reference temperature to selectively compensate the circuit response to accurately account for variances in the electrical characteristics of the temperature probe at temperatures above and below the reference temperature. The system further provides a unique warning system which indicates a dangerous temperature condition existent at the probe or a malfunction within the converting and compensating circuit 9 or within the leads connecting the circuit 9 to the probe. The system responds to open circuits, short circuits, power failures and the like and notifies an attendant that an improper metering of fluid flow may have occurred or will take place.

Various modes of carrying out the invention are contemplated as being within the scope of the following claims particularly pointing out and distinctly claiming the subject matter which is regarded as the invention.

I claim:

1. A fluid flowmeter compensating system, comprising a flowmeter providing a metered output in response to fluid flow, a transducer including a probe providing an output in response to a sensed parameter of the fluid, a converter connected to said transducer through means providing a connecting circuit and providing an output varying in response to the relative difference between the sensed parameter of the fluid and a preselected reference parameter for the fluid, said converter including means providing a source operatively connected to supply a constant signal through a series connected circuit including said probe provided by said transducer and a reference impedance having a preselected magnitude corresponding to said preselected reference parameter and means responding to the signal variations across said series connected circuit and providing a variation responsive signal continually tracking the change in the sensed parameter with respect to the reference parameter to said converter output, and utilization means connected to said converter and to said flowmeter and providing a compensated metered output relating to said preselected reference parameter in response to said converter output.

2. A fluid flowmeter compensating system, comprising a flowmeter providing a metered output in response to fluid flow, a transducer including a probe providing an output in response to a sensed parameter of the fluid, a converter connected to said transducer through means providing a connecting circuit and providing an output varying in response to the relative difference between the sensed parameter of the fluid and a preselected reference parameter for the fluid, said converter including means providing a source operatively connected to supply a constant signal to said probe provided by said transducer and to a reference impedance having a preselected magnitude corresponding to said preselected reference parameter and means responding to the signal variations at said reference impedance and said probe including amplifying means having a first input operatively connected to said reference impedance and a second input operatively connected to said probe through said connecting circuit means and providing a variation responsive signal continually tracking the change in the sensed parameter with respect to the reference parameter to said converter output, said converter output operatively connected to said amplifier output and to said probe through said connecting circuit means, and utilization means connected to said converter and to said flowmeter and providing a compensated metered output relating to said preselected reference parameter in response to said converter output.

3. A fluid flowmeter compensating system, comprising a flowmeter providing a metered output in response to fluid flow, a sensing circuit including probe means providing an output in response to a sensed parameter of the fluid and reference means providing a preselected reference parameter, means supplying a constant energizing signal to said probe means and said reference means, first means connected to said sensing circuit and providing a first signal responsive to the energization of said probe means and said reference means, second means connected to said sensing circuit and providing a second signal responsive to the energization of one only of said probe means and said reference means, output means connected to said first and second means and operatively combining said first and second signals and providing an output signal varying in response to the relative difference between the sensed parameter of the fluid and the preselected reference parameter, and utilization means operatively connected to said output means and to said flowmeter and providing a compensated metered output relating to said preselected reference parameter in response to said output signal.

4. A fluid flowmeter compensating system, comprising a flowmeter providing a metered output in response to fluid flow, a transducer including a probe providing an output in response to a sensed parameter of the fluid, a converter remotely spaced from said transducer and including means providing a constant signal source connected to a reference impedance having a preselected magnitude corresponding to a preselected reference parameter for said fluid, means connecting said transducer to said remotely located converter including a first conducting path operatively connecting said constant signal source means to said probe, through said reference impedance said converter including means connected to said reference impedance and to said remotely located probe through a second conducting path of said connecting means providing an impedance subject to variation in response to extraneous environmental surroundings and providing an output signal indicative of the relative difference between the sensed parameter of said metered fluid and the preselected reference parameter and continually cancelling erroneous signals due to impedance variations in said second conducting path, and utilization means connected to said converter and to said flowmeter and providing a compensated metered output relating to said preselected reference parameter in response to said converter output signal.

5. A remote temperature sensing system for flowmeter compensation, comprising a flowmeter providing a metered output in response to fluid flow, a remotely located temperature-sensitive probe resistor having a variable resistance responding to changes in temperature of the sensed fluid and providing a preselected probe resistance at a reference temperature of said fluid, a converter connected to said remotely located temperature-sensitive resistor through a first conducting circuit having a first impedance magnitude at said reference temperature, said converter including a constant current source connected to said probe resistor through a reference resistor having a preselected reference resistance substantially equivalent to said preselected probe resistance and said first conducting circuit, said converter connected to said probe resistor through a second current conducting circuit having a second impedance magnitude at said reference temperature substantially equivalent to said first impedance magnitude, said converter including means connected to said reference resistor and to said remotely located probe resistor and providing an output signal representing the difference between the actual temperature of the fluid and the reference temperature in response to the sensed difference in resistance between said probe resistor and said reference resistor and continually cancelling erroneous signals due to impedance variations in said first and second circuits due to extraneous environmental surroundings, and utilization means connected to said converter and to said flowmeter and providing a compensated metered output relating to said reference temperature in response to said converter output signal.

6. A fluid flowmeter compensating system, comprising a flowmeter providing a metered output in response to fluid flow, a transducer including a probe resistance providing an output in response to a sensed parameter of the fluid, a signal converter remotely spaced from said transducer and including a source having an output circuit supplying a constant current signal connected in series electrical circuit including a reference resistor having a resistance equal to the probe resistance at a predetermined reference temperature and a first connecting circuit connected to said probe resistance, said signal converter including an operational amplifier with a substantially unity gain having a first high impedance input connected to said constant current output circuit and second high impedance input connected to said probe resistance through a second connecting circuit, said amplifier having an output connected to a first output circuit of said signal converter and said signal converter including a third connecting circuit having a resistance substantially equal to the resistance of said first connecting circuit and connecting said probe resistance to a second output circuit of said signal converter, said signal converter continually tracking the change in the probe resistance with respect to the reference resistance and providing an analog signal at said first and second output circuits indicative of the relative difference between the sensed temperature of the fluid and the predetermined reference temperature and continually cancelling erroneous signals due to resistance variations in said first and third connecting circuits, and utilization means operatively connected to said signal converter and to said flowmeter and providing a compensated metered output related to said preselected reference temperature in response to said analog signal.

7. The compensating system of claim 6, wherein said analog signal provides a relative first polarity when said sensed temperature is greater than said reference temperature and a relative second polarity when said sensed temperature is less than said reference temperature, and including an analog-to-digital converter connected to said signal converter and providing a predetermined number of digital outputs to said utilization means in response to said analog signal.

8. A fluid flowmeter compensating system, comprising a flowmeter providing a metered output in response to fluid flow, a transducer including a probe providing an output in response to a sensed parameter of the fluid, a power source, a control circuit connected to said power source and including an output operatively connected to said transducer and providing a constant current, said control circuit including a control amplifier having a first input operatively connected to a Zener diode and providing a reference signal and a second input operatively connected to said output and providing a regulating signal indicative of the constant current, and a regulator connected to supply a constant current to said Zener diode and stabilizing said reference signal at said first input irrespective of fluctuations in said power source and stabilizing said constant current at said control circuit output, a converter operatively connected to said transducer and providing an output signal responsive to the sensed parameter of said fluid, and utilization means operatively connected to said converter and to said flowmeter and providing a compensated metered output in response to said converter output signal.

9. The compensating system of claim 8, wherein said regulator comprises a voltage regulator operating as a current sink.

10. A fluid flowmeter compensating system, comprising a flowmeter providing a metered output in response to fluid flow, a transducer including a probe providing an output in response to a sensed parameter of the fluid, a selectively adjustable constant current source operatively connected to said transducer, a converter operatively connected to said transducer and providing an output signal responsive to the sensed parameter of said fluid, means operatively connected to said transducer and to said constant current source and providing a first output in response to the sensed parameter having a first predetermined value to condition said current source to provide a first predetermined constant current to said transducer and providing a second output in response to the sensed parameter having a second predetermined value different than said first value to condition said current source to provide a second predetermined constant current different than said first current to said transducer, and utilization means operatively connected to said converter and to said flowmeter and providing a compensated metered output in response to said converter output.

11. The compensating system of claim 10, wherein said constant current source includes a control circuit connected to a power source and including an output operatively connected to said transducer and selectively providing said first and second constant currents, said control circuit including a control amplifier having a first input operatively connected to a selectively variable reference and a second input operatively connected to said output and providing a regulating signal indicative of said first and second constant currents, said reference responding to said sensed parameter being greater than a reference parameter to provide a first predetermined reference signal to said first input for providing said first predetermined constant current and responding to said sensed parameter being less than said reference parameter to provide a second predetermined reference signal different than said first predetermined reference signal to said first input for providing said second predetermined constant current.

12. The compensating system of claim 10, wherein said current source conditioning means includes an analog-to-digital converter operatively responding to said converter output signal and transferrable between a first condition to provide said first output in response to said sensed parameter being greater than a reference parameter and a second condition to provide said second output in response to said sensed parameter being less than said reference parameter.

13. The compensating system of claim 10, wherein said converter provides an analog signal output having a first relative polarity in response to said sensed parameter being greater than a reference parameter and a second relative polarity in response to said sensed parameter being less than said reference parameter, said current source conditioning means connected to said converter and providing said first output in response to said first polarity analog signal output and said second output in response to said second polarity analog signal output.

14. The compensating system of claim 2, and including means operatively connected to said converter and responding to said output signal and providing a first output during a normal sensing sequence and a second output different than said first output and providing a malfunction warning in response to said output signal having a predetermined value and indicating a sensed malfunction within said system.

15. The compensating system of claim 14, wherein said connecting circuit includes first and second leads connected to said probe to form a remote circuit, said malfunction means providing said second output in response to an open circuit within said remote circuit and indicating a sensed malfunction within the system.

16. The compensating system of claim 14, wherein said connecting circuit includes first and second leads connected to said probe to form a remote circuit, said malfunction means providing said second output in response to a short circuit within said remote circuit and indicating a sensed malfunction within the system.

17. The compensating system of claim 14, wherein said malfunction means provides said second output in response to the fluid sensed parameter exceeding a predetermined magnitude and indicating a sensed malfunction within the system.

18. The compensating system of claim 14, wherein said malfunction means provides said second output in response to an intermittent failure of a power source and indicating a sensed malfunction within the system.

19. The compensating system of claim 14, and including an analog-to-digital converter connected to receive said output signal from said converter and providing an overload output, said malfunction sensing means connected to said overload output and providing said second output in response to said analog signal exceeding a predetermined magnitude.

20. The compensating system of claim 14, and including an analog-to-digital converter connected to receive said output signal from said converter and providing a predetermined number of digital outputs, said malfunction sensing means responding to one of said digital outputs to provide said second output in response to said analog signal exceeding a predetermined magnitude.

21. The compensating system of claim 20, wherein said analog-to-digital converter provides an overload output, said malfunction sensing means connected to said overload output and providing said second output in response to said analog signal exceeding a second predetermined magnitude greater than said first predetermined magnitude.

22. The compensating system of claim 14, wherein said malfunction means includes a switching circuit operating from a first condition to a second condition in response to said second output and actuating a malfunction warning signal.

23. The compensating system of claim 22, wherein said switching circuit includes a manually resettable latch for maintaining said second condition until manually reset.

24. A fluid flowmeter compensating system, comprising a flowmeter providing an output in response to fluid flow, a transducer including a probe providing an output in response to a sensed parameter of the fluid, a converter electrically connected to said transducer through a connecting circuit to said probe and providing an output signal indicative of the relative difference between the sensed parameter of the fluid and a preselected reference parameter, means operatively connected to said converter and to said flowmeter and providing a compensated metered output relating to said preselected reference parameter in response to said converter output signal, and means operatively connected to said converter and responding to said output signal and providing a first output during a normal sensing sequence and a second output different than said first output in response to an intermittent failure of a power source and indicating a sensed malfunction within the system and providing a malfunction warning, said converter including an amplifier operatively connected to said transducer and to said malfunction means and having an input circuit connected to said power source, said amplifier responding to the intermittent failure of said power source and saturating in response to the re-application of power and operatively transferring said malfunction means from said first output to said second output.

25. A fluid flowmeter compensating system, comprising a flowmeter providing a metered output in response to fluid flow, a transducer including a probe providing an output in response to a sensed parameter of the fluid, a converter connected to said transducer through means providing a connecting circuit and providing an output varying in response to the relative difference between the sensed parameter of the fluid and a preselected reference parameter for the fluid, said converter including means providing a source operatively connected to supply a constant signal to said probe provided by said transducer and to a reference impedance having a preselected magnitude corresponding to said preselected reference parameter and means responding to the signal variations in said reference impedance and said probe including amplifying means having a first input operatively connected to said reference impedance and a second input operatively connected to said probe through said connecting circuit means and providing a variation responsive signal continually tracking the change in the sensed parameter with respect to the reference parameter to said converter output, utilization means connected to said converter and to said flowmeter and providing a compensated metered output relating to said reference parameter in response to said converter and flowmeter outputs, and malfunction means operatively connected to said converter and providing a malfunction warning in response to a predetermined magnitude of said variation responsive signal to indicate any one of a plurality of possible sensed malfunctions including an open circuit within said connecting circuit, a short circuit within said connecting circuit, an excessive sensed fluid parameter, or an intermittent power failure.

26. A fluid flowmeter compensating system, comprising a flowmeter providing a metered output in response to fluid flow, a transducer including a probe impedance providing an output in response to a sensed parameter of the fluid, a signal converter connected to said transducer through means providing a connecting circuit and including means providing a constant signal source operatively connected to said transducer and to a reference impedance having a preselected magnitude corresponding to a preselected reference parameter for said fluid, said converter including amplifying means having a first input selectively connected to said reference impedance and a second input operatively connected to said remotely located probe through said connecting circuit means and an amplifier output responding to signal variations at said first and second inputs, said converter providing an output operatively connected to said amplifying means output and to said probe through said connecting circuit means and responsive to the relative difference between the sensed parameter of said fluid and the preselected reference parameter, and utilization means connected to said converter and to said flowmeter and providing a compensated metered output relating to said preselected reference parameter in response to said converter output, said converter including a simulated probe impedance selectively connected in circuit to calibrate said converter output in accordance with a simulated fluid parameter.

27. The compensating system of claim 26, wherein said converter output provides an analog signal, and including an analog-to-digital converter responding to said analog signal and providing a digital output including a readout display indicative of said analog signal, said simulated probe impedance corresponding to a simulated preselected reference parameter of said fluid selectively connected operatively to said constant signal source and to said converter output, said amplifying means including an off-set adjust circuit selectively variable with said simulated probe impedance connected in circuit until providing a predetermined calibrated output at said readout display.

28. The compensating system of claim 26, wherein said converter output provides an analog signal, and including an analog-to-digital converter responding to said analog signal and providing a digital output including a readout display indicative of said analog signal, said simulated probe impedance corresponding to a preselected reference parameter of said fluid selectively connected operatively to a constant signal output of said source and to said converter output, said constant signal source including means selectively operable and varying the constant signal at said source output with said simulated probe impedance connected in circuit until providing a predetermined calibrated output at said readout display.

29. The compensating system of claim 27, wherein said converter includes a second simulated probe impedance corresponding to a second preselected reference parameter of said fluid selectively connected operatively to a constant signal output of said constant source and to said converter output, said constant signal source including means selectively operable and varying the constant signal at said source output with said second simulated probe impedance connected in circuit until providing a second predetermined calibrated output at said readout display different than the first predetermind calibrated display.

30. The compensating system of claim 29, wherein said converter includes a third simulated probe impedance corresponding to a third preselected reference parameter of said fluid selectively connected operatively to said constant signal source and to said converter output, said converter operative with said third simulated probe impedance connected in circuit to provide a third predetermined calibrated output at said readout display different than said first and second predetermined calibrated outputs.

31. The compensating system of claim 30, wherein said converter includes a selectively connectable circuit for independently connecting said first, second and third simulated probe impedances in circuit and electrically removing said probe from operative connection with said converter.

32. A fluid flowmeter compensating system, comprising a flowmeter providing a metered output in response to fluid flow, a transducer including a probe providing an output in response to a sensed parameter of the fluid, a signal converter providing an output responsive to the relative difference between the sensed parameter of the fluid and a preselected reference parameter for the fluid and connected to said transducer through means providing a connecting circuit and including amplifying means having a first input operatively connected to a reference impedance and a second input operatively connected to said probe through said connecting circuit means and an amplifier output responding to signal variations at said first and second inputs and connected to said signal converter output, utilization means operatively connected to said signal converter and to said flowmeter and providing a compensated metered output relating to said preselected reference parameter in response to said signal converter output, and an analog-to-digital converter responding to said signal converter output and providing a digital output including a readout display indicative of said signal converter output, said signal converter including a simulated probe impedance corresponding to a simulated preselected reference parameter of said fluid selectively connected operatively to said signal converter and said amplifying means including an off-set adjust circuit selectively variable with said simulated probe impedance connected in circuit until providing a predetermined calibrated output at said readout display indicative of the relative difference between the simulated parameter and the reference parameter.

33. A fluid flowmeter compensating system, comprising a flowmeter providing a metered output in response to fluid flow, a transducer including a probe providing an output in response to a sensed parameter of the fluid, a signal converter providing an output responsive to the relative difference between the sensed parameter of the fluid and a preselected reference parameter for the fluid and connected to said transducer through means providing a connecting circuit and including means providing a constant signal source operatively connected to said transducer and to a reference impedance, utilization means connected to said converter and to said flowmeter and providing a compensated metered output relating to said preselected reference parameter in response to said converter output, and an analog-to-digital converter responding to said signal converter output and providing a digital output including a readout display indicative of said signal converter output, said converter including a simulated probe impedance corresponding to a preselected reference parameter for said fluid selectively connected operatively to a constant signal output of said constant source and to said converter output, said constant source including means selectively operable and varying the constant signal at said source output with said simulated probe impedance connected in circuit until providing a predetermined calibrated output at said readout display indicative of the relative difference between the simulated parameter and the reference parameter.

34. In a fluid flowmeter compensating system providing a compensated metered output in response to an output of a flowmeter responding to fluid flow and to an output representing the difference between a sensed parameter of the fluid and a reference parameter of the fluid provided by a signal converter connected to a parameter sensing probe and to a readout display and including an amplifier with a selectively adjustable gain and a selectively adjustable constant signal source, a method of calibrating said signal converter including the steps of selectively connecting first and second simulated parameter elements differing in characteristics with respect to each other to said signal converter, and varying the gain of said amplifier to a predetermined setting to provide a first predetermined reading at said readout display and varying said signal source to provide a predetermined constant signal and a second predetermined reading at said readout display.

35. The method of claim 34, and including the step of selectively connecting a third simulated parameter element differing in characteristic from said first and second elements to said signal converter and monitoring said readout display for a third predetermined reading indicating a properly calibrated signal converter.

* * * * *

UNITED STATES PATENT AND TRADEMARK OFFICE
CERTIFICATE OF CORRECTION

PATENT NO. : 4,072,051
DATED : February 7, 1978
INVENTOR(S) : Jerry R. Peterson

It is certified that error appears in the above-identified patent and that said Letters Patent are hereby corrected as shown below:

| | |
|---|---|
| Column 10, Line 58 | Delete "by" and substitute therefor ---of--- |
| Column 11, Line 5 | Add a negative sign (-) before the designation "$I_C$" |
| Column 11, Line 18 | Delete the equal sign (=) between the terms "$R_T$" and "$R_{REF}$" and substitute therefor a negative sign (-) |
| Column 11, Line 60 | Delete "applied" and substitute therefor ---supplied--- |
| Column 15, Line 33 | Delete "to", first occurrence and substitute therefor ---at--- |

Signed and Sealed this

Twenty-seventh Day of June 1978

[SEAL]

Attest:

RUTH C. MASON
Attesting Officer

DONALD W. BANNER
Commissioner of Patents and Trademarks